United States Patent [19]

Murray et al.

[11] Patent Number: 4,699,088
[45] Date of Patent: Oct. 13, 1987

[54] CAGING ASSEMBLY FOR ANIMALS WITH A WATERING MAINFOLD

[75] Inventors: Dale R. Murray, Burlington; Michael A. Coiro, Sr., Wrightstown, both of N.J.

[73] Assignee: Allentown Caging Equipment Co., Inc., Allentown, N.J.

[21] Appl. No.: 910,740

[22] Filed: Sep. 23, 1986

[51] Int. Cl.⁴ .................... A01K 31/00; A01K 7/00
[52] U.S. Cl. ........................... 119/18; 119/15; 119/22; 119/72.5
[58] Field of Search ............... 119/15, 17, 18, 19, 119/22, 72, 72.5, 75; 604/201

[56] References Cited

U.S. PATENT DOCUMENTS

| | | |
|---|---|---|
| 2,946,308 | 7/1960 | Harris ................................ 119/18 |
| 3,055,364 | 9/1962 | Myerson et al. ............... 604/201 X |
| 3,228,377 | 1/1966 | Grassano . |
| 3,251,342 | 5/1966 | Kay ................................... 119/18 |
| 3,343,520 | 9/1967 | Schwarz, Jr. . |
| 3,358,649 | 12/1967 | Gabriel et al. . |
| 3,518,971 | 7/1970 | Gass et al. . |
| 3,528,227 | 9/1970 | Lee et al. . |
| 3,528,390 | 9/1970 | Lee . |
| 3,537,428 | 11/1970 | Montgomery . |
| 3,585,968 | 6/1971 | Stone, Jr. . |
| 3,613,639 | 10/1971 | Lee . |
| 3,752,124 | 8/1973 | Gabriel . |
| 3,877,420 | 4/1975 | Eagleson, Jr. . |
| 3,916,837 | 11/1975 | Murto . |
| 3,924,571 | 12/1975 | Holman . |
| 3,965,864 | 6/1976 | Beltz ................................ 119/18 |
| 4,055,147 | 10/1977 | Fletcher et al. . |
| 4,334,500 | 6/1982 | Ziller . |
| 4,346,672 | 8/1982 | Niki . |
| 4,365,590 | 12/1982 | Ruggieri et al. . |
| 4,373,471 | 2/1983 | Coulbourn ................... 119/72.5 X |
| 4,458,632 | 7/1984 | Niki . |
| 4,480,587 | 11/1984 | Sedlalek . |
| 4,593,650 | 6/1986 | Lattuada ......................... 119/15 |

FOREIGN PATENT DOCUMENTS 36628 9/1981 European Pat. Off. .
2065440 7/1981 United Kingdom .

Primary Examiner—Carl D. Friedman
Assistant Examiner—R. Chilcot
Attorney, Agent, or Firm—Richard C. Woodbridge; Alan M. Sack

[57] ABSTRACT

An improved cage assembly for confining animals having a watering manifold for mounting on an aperture in the cage allowing the confined animals to be supplied with water from an outside watering system. The watering manifold allows the cage assembly to be disconnected from and reconnected to the outside watering system without destroying the integrity of the biologically micro-isolated cage from the environment whenever the cage assembly is removed for handling, treating or observing the animals.

28 Claims, 10 Drawing Figures

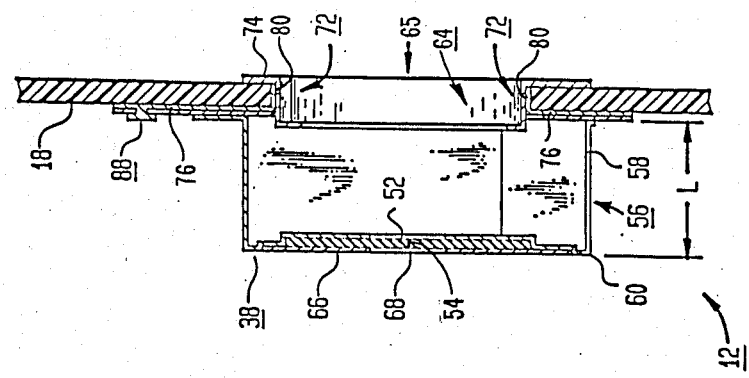
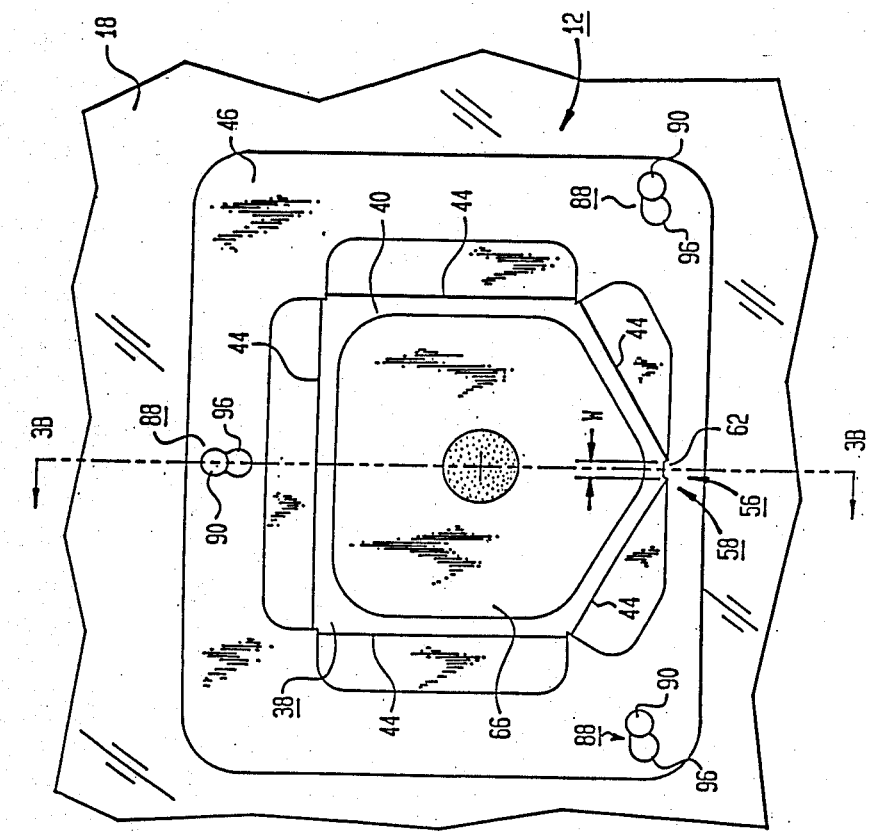

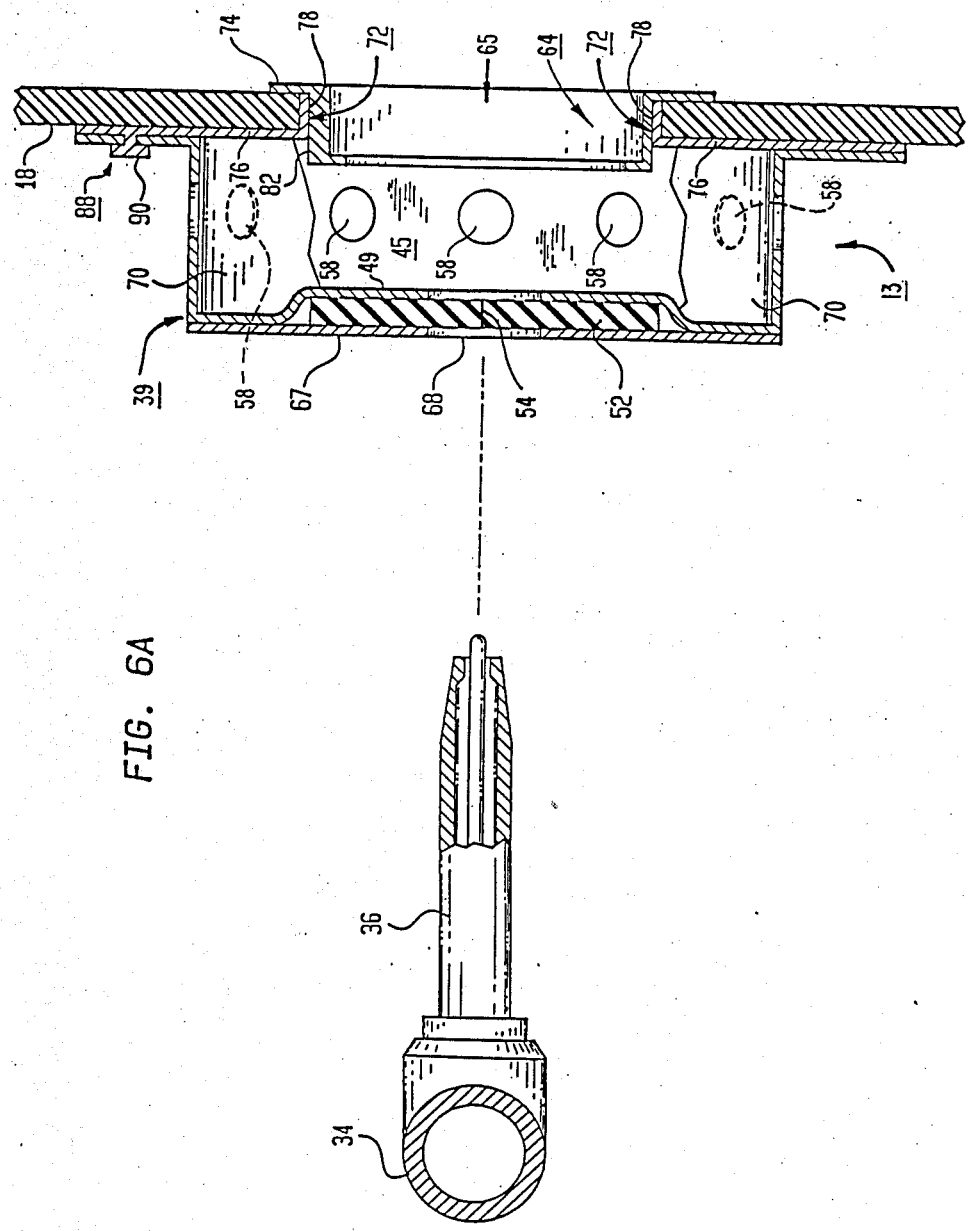

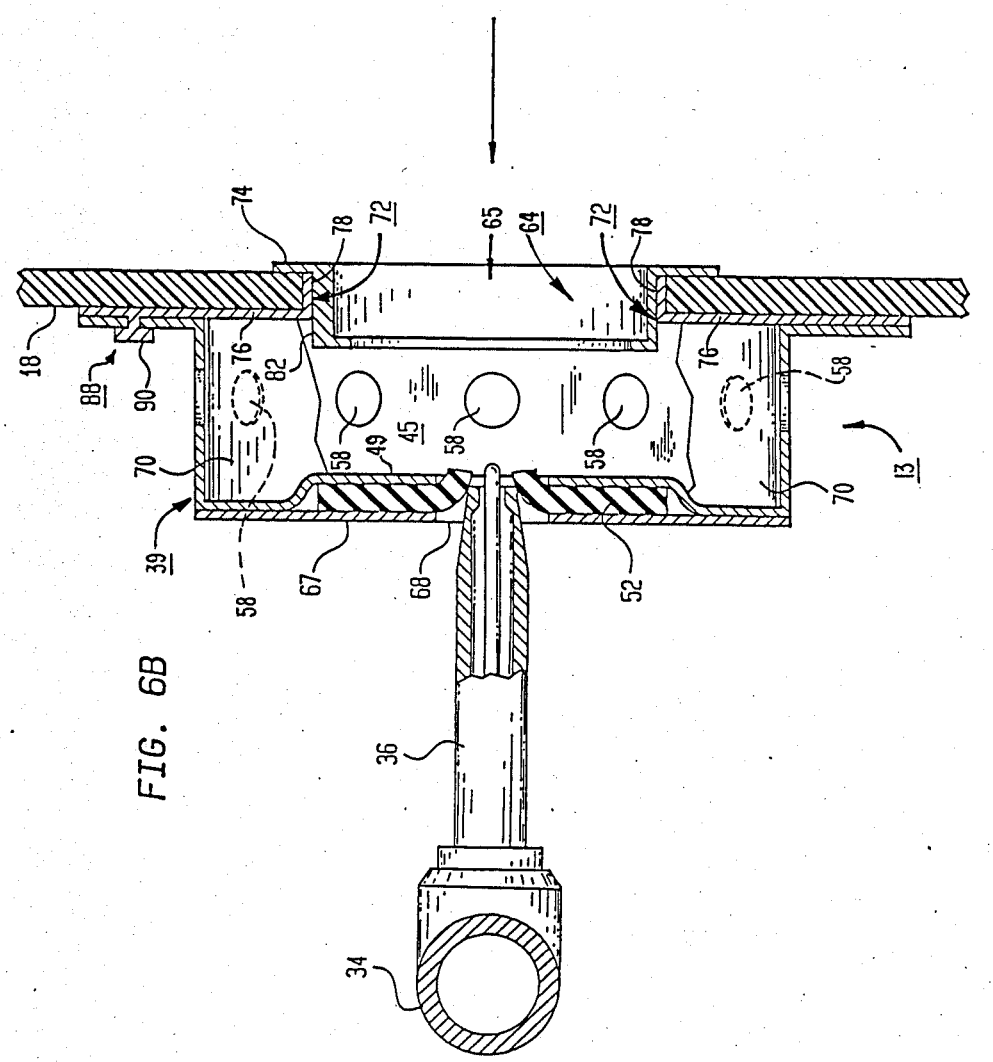

CAGING ASSEMBLY FOR ANIMALS WITH A WATERING MAINFOLD

BACKGROUND OF THE INVENTION

1. Field of Invention

This invention pertains to an improved cage assembly for confining laboratory animals having a watering manifold mounted on the cage to allow the animals to be supplied with water from an outside automatic watering system.

2. Description of the Related Arts

In the care and feeding of laboratory animals, several systems have evolved over the past 50 years or so. The earliest of these systems is known as a "horsestall" system which includes a number of wire stalls in which the laboratory animals are housed and a trough running outside of the stalls which contains water and other nutrients. The laboratory animals can stick their heads through the wire cage and drink from the trough. Such a system for feeding poultry is shown in U.S. Pat. No. 3,916,837 issued to Murato on Nov. 4, 1975. The disadvantage of the "horsestall" cages, such as Murato is the danger of crosscontamination between animals in adjacent stalls and through the water in the common trough. Also, the cages cannot be easily removed from the system and brought to a work station where the animals can be handled or treated.

Some of the problems with the "horsestall" system were solved by a system of cages which comprised a number of stainless steel "shoeboxes" placed on a rack. Each stainless steel "shoebox" has an open wire mesh bottom for the disposal of droppings and fluids. The "shoeboxes" are supplied with drinking water from a centralized outside watering system. A "shoebox" system is illustrated in the U.S. Pat. No. 3,585,968 issued to Stone, Jr. on June 22, 1971. Although preferable to the old "horsestall" system, this system suffers from several other drawbacks: First, the steel cages are not easily removable from the rack for observation and treatment of the animals. Second, the stainless steel "shoeboxes" are not transparent so that the animals do not get an adequate supply of sunlight and the animals cannot be easily observed. Third, the individual "shoeboxes" are not biologically isolated from one another, having a substantially open bottom, perforated sides and an open entrance for each individual watering tubes. If, however, the bottoms were closed, and the individual watering tubes were sealed off, then these cages would suffer from the additional problem of flooding because excess water constantly drips from the watering tubes and would flood the cages.

Some of the problems of the "shoebox" type cages have been solved by complicated systems such as the one disclosed in U.S. Pat. No. 3,924,571 issued to Holman on Dec. 9, 1975 which discloses a number of totally enclosed cages with the very complicated germ free ventilation and watering system. The problem with rack system is that it is expensive and although it offers a rack with individual environments for the laboratory animals which do not cross-contaminate, the individual cages cannot easily be removed from the rack for treating, handling or observing the animals.

Another complicated and expensive cage assembly is disclosed in U.S. Pat. No. 3,877,420 issued to Eagleson, Jr. on Apr. 15, 1975. However, this cage suffers from the same drawbacks as the U.S. Pat. No. 3,924,571 Holman patent in that it is complicated, expensive and not easily portable.

The watering systems for supplying water to the "shoebox" and "horsestall" cage systems has been improved over the years. One such improved watering system is disclosed in U.S. Pat. No. 4,055,147 issued to Fletcher, et al. on Oct. 25, 1977 which discloses an automatic fluid dispenser that will only dispense water to cages at predetermined times. Also, water on demand watering tubes have recently been developed which dispense water when the animal licks a small ball or pin at the end of the watering tube. Three such water on demand watering tubes are disclosed in U.S. Pat. Nos. 3,228,377 issued to Grassano on Jan. 11, 1966, U.S. Pat. No. 4,346,742 issued to Niki on Aug. 31, 1982 and U.S. Pat. No. 4,458,632 issued to Niki on July 10, 1984. The U.S. Pat. Nos. 4,346,472 and the 4,458,632 issued to Niki also provide for a small guard on the bottom of the watering tube to allow excess water to drain out of the cage so that the cage does not flood. However, use of these water on demand watering tubes does not solve the problems of the "horsestall" or "shoebox" systems of cross-contamination, portability and non-transparency.

The most inexpensive and popular cages now in use are polycarbonate cages. Polycarbonate cages are relatively inexpensive, transparent and are readily portable. Examples of early polycarbonate cages and accessories thereof are disclosed in U.S. Pat. Nos. 3,358,649; 3,518,971; 3,752,124 and 4,334,500. The major disadvantage of these cages was the problem of cross-contamination between adjacent cages or contamination by the surrounding environment.

By adding a filtered top to the early polycarbonate cages, the problem of cross-contamination has been solved and a biologically micro-isolated environment is formed within each cage. Several micro-isolated polycarbonate cage assemblies have been developed, for example, U.S. Pat. Nos. 4,480,587; 3,613,639; 3,528,390; 3,528,227; 3,343,520; 5,537,428; 3,304,913 as well as G.B. Pat. No. 2,065,440 and European Pat. No. 0,036,628. Typical of the biologically micro-isolated polycarbonate cage assemblies is the "Animal Cage Assembly with Reuseable Filter Cap" disclosed in U.S. Pat. No. 4,480,587 issued to Sedlacek on Nov. 6, 1984. The Sedelak patent discloses a polycarbonate cage, a wire cage lid which was first disclosed in U.S. Pat. No. 3,358,649 issued to Gabriel, et al. on Dec. 19, 1967, and a filter cap for micro-isolating the cage from the outside environment. The laboratory animals are supplied with water from a water bottle placed in a compartment on the wire cage lid with a watering tube extending into the confined space below. Although these micro-isolated polycarbonate cage assemblies are substantially biologically micro-isolated from the outside environment, transparent and easily transported to various locations, a number of problems still remain with regard to these cage assemblies. First, the water bottles have to be changed periodically and autoclaved. Changing the water bottles and autoclaving requires approximately 12 steps, many of which must be done by hand under sterile conditions inside a HEPA (High Efficiency Particulate Air) filtered hood, and require the use of an autoclave costing approximately $100,000.00 or more. In addition, use of a watering bottle which must be changed causes other problems, such as, upsetting the biorythems of many of the nocturnal laboratory animals, retinal and other diseases caused by pseudonymous bacteria building up in the lip of the watering tube prior to changing or due to insufficient autoclaving.

None of the related art teaches or discloses a manner of connecting the biologically micro-isolated polycarbonate cage assemblies, such as the one disclosed by Sedalek, to an outside watering system without destroying the integrity of the micro-isolated environment of the cage. Merely inserting a water on demand tube, like the one disclosed by Niki, through the wall of a micro-isolated cage assembly, such as the one disclosed by Sedelak, would result in a host of new problems. First, excess water would stay at the bottom of the cage assembly creating a new contamination problem. Second, the cage could not be easily removed from the outside watering system for treatment, observation or handling of the confined animals without destroying the integrity of the biologically micro-isolated cage from the environment. Third, the water dispensers disclosed by Niki include a small aperture which would destroy the integrity of the biologically micro-isolated of the cage assembly from the outside environment.

U.S. Pat. No. 4,365,590 issued on Dec. 28, 1982 to Ruggieri, et al., exemplifies one attempt which has been made to combine a water on demand tube from an outside watering system with a polycarbonate cage. The Ruggieri, et al. system discloses a ventilated rack connected to an outside ventilation and an outside watering system and a plurality of open cages which are placed in the rack. Each cage has an opening in its wall and an access port mounted in the opening and attached to the wall with a press fitted ring on the outside of the aperture. The confined animal can drink by sticking its tongue through the access port and licking the water on demand tube outside the cage. Excess water collects in a trough under the watering tube. Several problems, however, still remain with the system of Ruggieri, et al. First, the problem of cross-contamination is not entirely solved. The cages are open, and the access port remains permanently open to allow cross-contamination from air within the rack. Second, if power were lost to the ventilation system of the rack the cages would cross-contaminate through their open tops their and open access ports. Third, the ventilated rack is complicated, very expensive and must be periodically cleaned and sterilized or it would present a much greater contamination problem then the individual cage assemblies.

Accordingly, it is an object of the present invention to solve the problems inherent in the related art by providing an improved cage assembly which is biologically micro-isolated from the outside environment and eliminates the need for a watering bottle.

It is another object of the present invention to provide an improved cage assembly which is biologically micro-isolated from the outside environment and supplies water on demand to the caged animals.

It is still a further object of the present invention to provide a cage assembly which is biologically micro-isolated from the outside environment and may be easily moved for treating, observing or handling caged animals by removing an cage assembly from an outside watering system without destroying the integrity of the biologically isolated cage from the outside environment.

SUMMARY OF THE INVENTION

Briefly described, this invention pertains to an improved cage assembly for confining laboratory animals. The improved cage assembly includes a cage having substantially non-permeable walls, floor and an open top body. A containment means confines the animals inside the cage, and a filter cap covers the cage for biologically micro-isolating the animals from the environment surrounding the cage assembly. The improved cage means includes a watering manifold mounted on an aperture in the cage. The watering manifold allows the animals to be supplied with water from an outside watering system. The watering manifold also allows the improved cage assembly to be disconnected from and reconnected to the outside watering system without destroying the integrity of the biologically micro-isolated cage from the environment whenever the cage assembly must be moved in order to handle, treat or observe the animals. The watering manifold includes the following:

An isolation extension means for mounting on the aperture of the cage assembly. The isolation extension means has walls for extending the biologically micro-isolated space of the cage assembly.

An access port mounted in the aperture of the cage assembly. The access port has an appropriate shape and size to allow the animals access to the automatic watering tube in the isolation extension means while denying the animals access to the water removal means and the diaphragm.

A water removal means is included in the watering manifold for removing water ffom the watering manifold in order to prevent water leaking out of the watering tube from flooding the cage assembly.

A diaphragm on the surface of the isolation extension means permits an automatic watering tube from an outside watering system to be introduced through the diaphragm into the watering manifold. The diaphragm of the isolation extension means connects the cage assembly to the outside watering system while maintaining the biological micro-isolation of the cage assembly when the cage assembly is connected to or disconnected from the outside watering system.

BRIEF DESCRIPTION OF THE DRAWINGS

FIG. 3A is a front elevational view of the preferred watering manifold of the present invention.

FIG. 3B is a elevational cross-sectional view of the watering manifold shown in FIG. 3A taken along the lines 3B—3B in the direction of the arrows.

FIG. 6A is a detail cross-sectional view of the watering manifold shown in FIG. 5 taken along the line 6—6 in the direction of the arrows.

FIG. 6B is the view as shown in FIG. 6A showing the present invention being initially engaged with the watering tube of the outside watering system.

DETAILED DESCRIPTION OF THE PREFERRED EMBODIMENT

During the course of this description, like numbers will be used to refer to like elements according to the different figures which illustrate the invention.

Figure 1A:
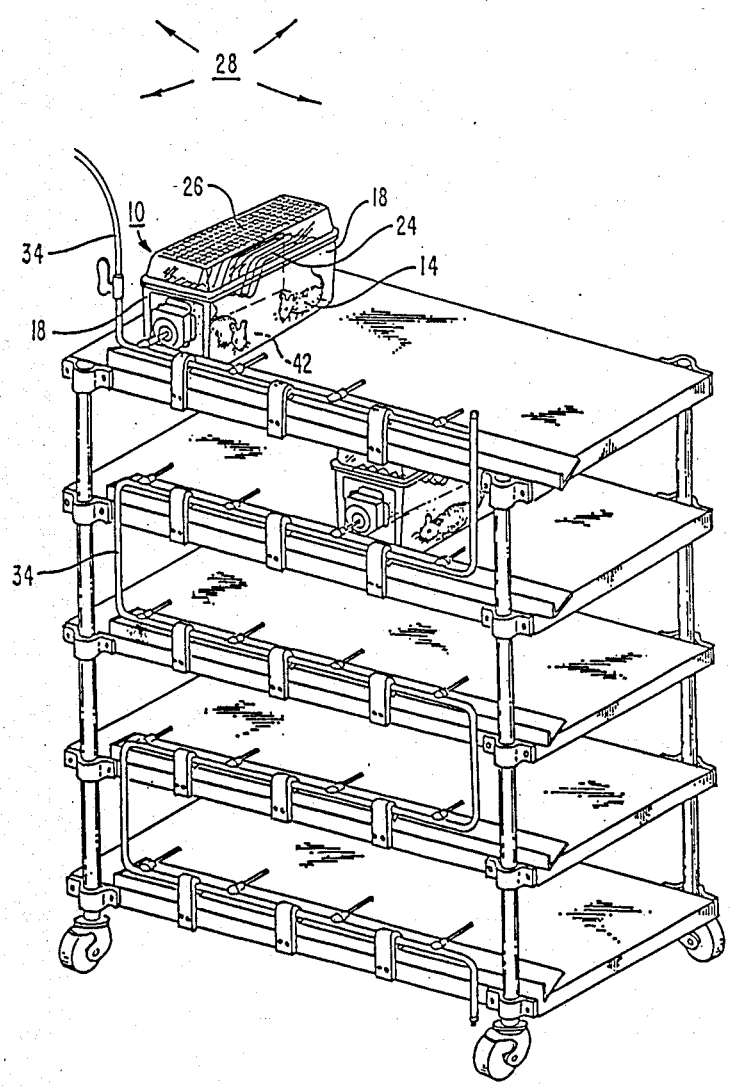
FIG. 1A is a prospective view of a rack for holding a number of cage assemblies of the present invention connected to an outside watering system showing the preferred cage assemblies of the present invention connected to the outside watering system.
Figure 1B:
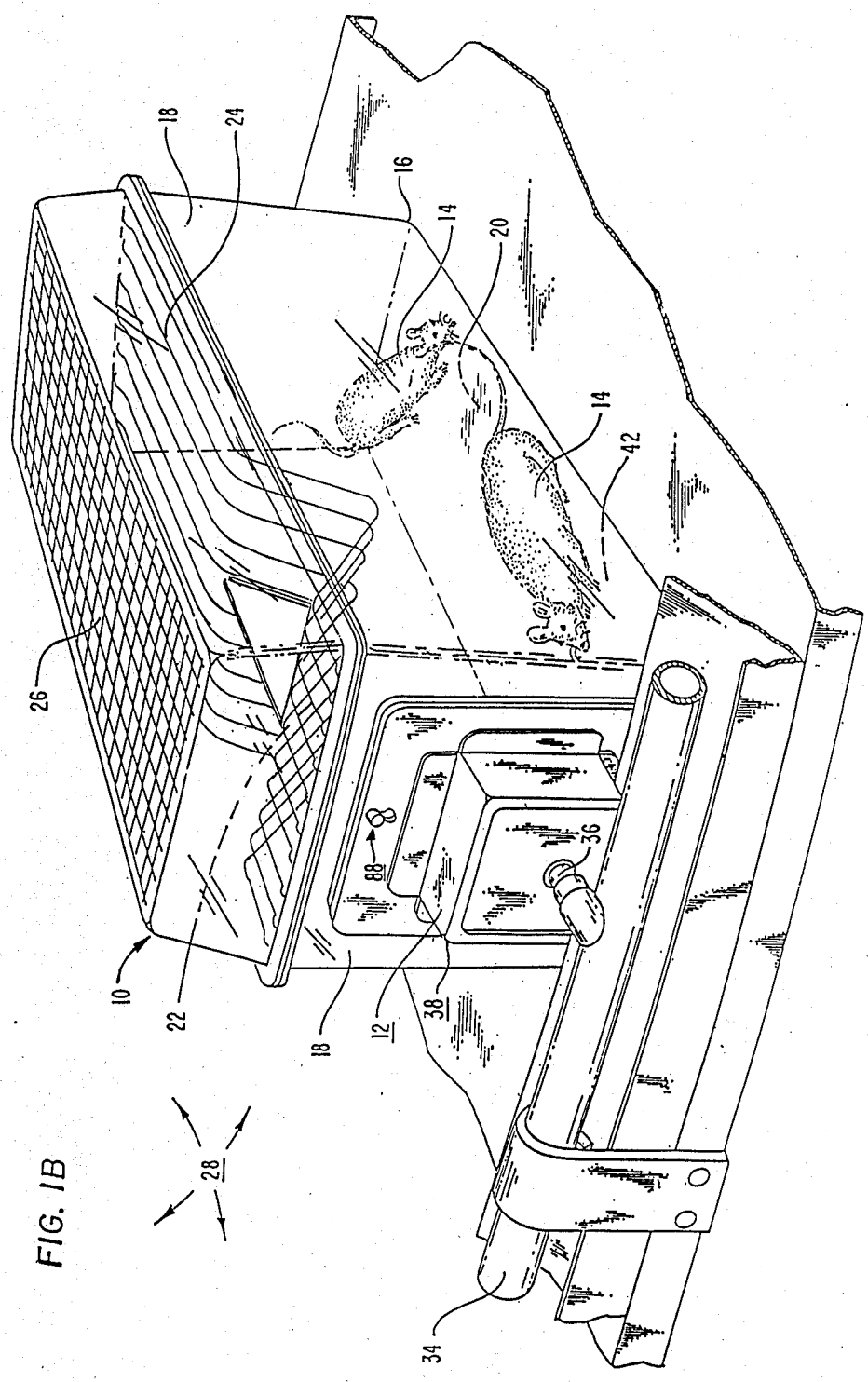
FIG. 1B is a magnified prospective view of the preferred cage assembly shown in FIG. 1A connected to the outside watering system.

An improved cage assembly 10 according to the preferred embodiment of the present invention is illustrated in FIGS. 1A and 1B. The cage assembly 10 is used to hold laboratory animals 14. It includes a cage 16 having walls 18, floor 20 and an open top body 22. The cage assembly 10 also includes a containment means 24 usually made from wire, to confine the animals 14 inside the cage 16 and a filter cap 26 which covers the cage 16 for biologically micro-isolating the animals 14 from the environment 28 surrounding the cage assembly 10. Preferably the cage 16 and the walls of the filter cap 26 are made from a clear plastic material, such as polycarbonate. The improvement of the present invention includes a watering manifold 12 which is mounted on an aperture 30 in one of the walls 18 of cage 16.

The preferred watering manifold 12 of the present invention, shown in FIGS. 1A-3B, allows the confined animals 14 to be supplied with water 32 from an outside watering system 34. In addition, the preferred watering manifold 12 allows the cage assembly 10 to be disconnected from and reconnected to the outside watering system 34 without introducing biological containments through the preferred watering manifold 12 so as not to destroy the integrity of the biologically micro-isolated cage assembly 10 from the environment whenever the cage assembly 10 must be moved in order to handle, treat or observe the animals 14.

Figure 2:
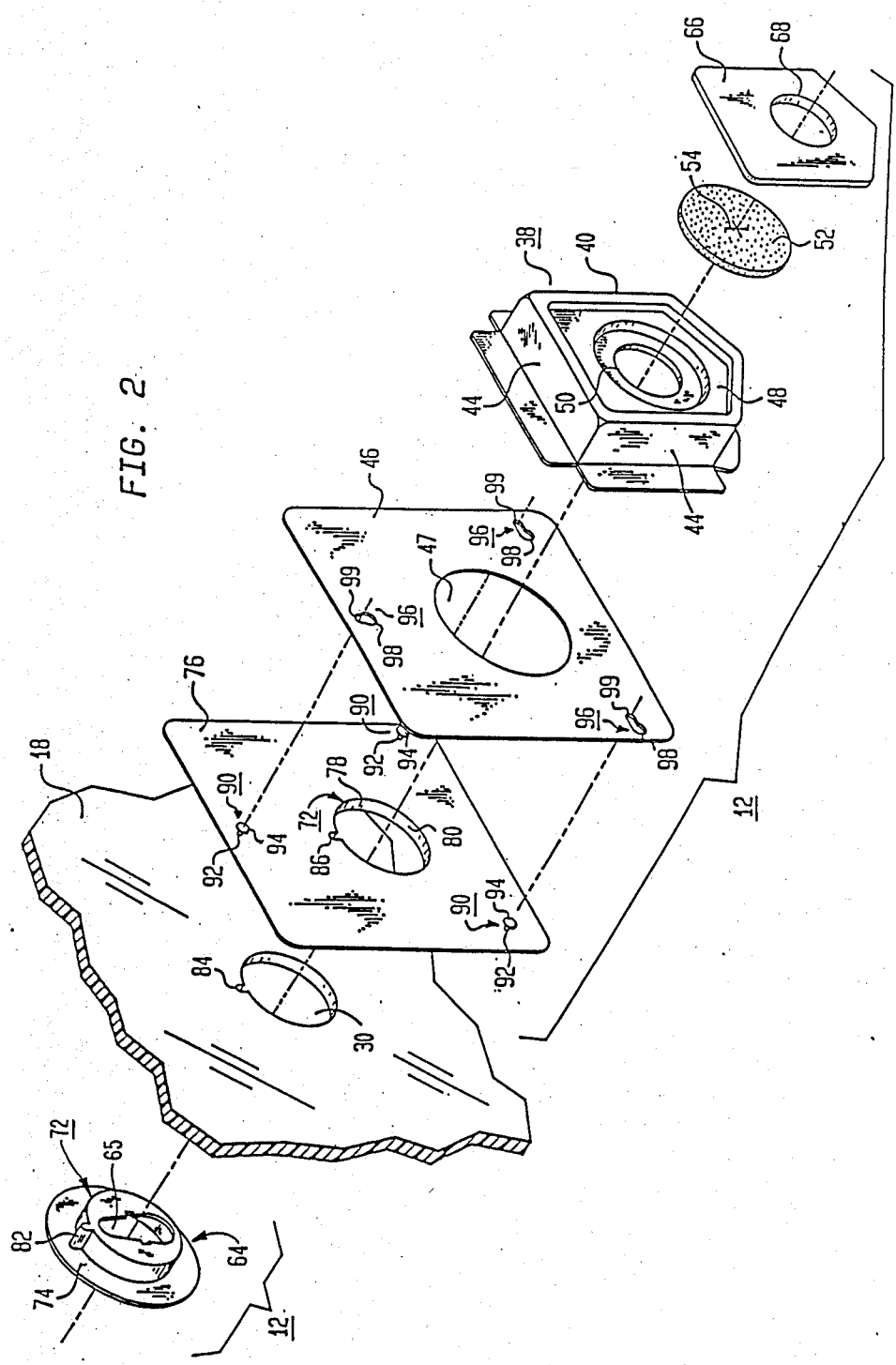
FIG. 2 is an exploded view of the preferred watering manifold of the present invention.

The preferred watering manifold 12, shown in the exploded view of FIG. 2, includes an isolation extension means 38 which is mounted on an aperture 30 in wall 18 of the preferred cage assembly 10. The isolation extension means 38 includes wall means 40 for extending the biologically isolated interior space 42 of the preferred cage assembly 10. In the preferred watering manifold 12, the isolation extension means 38 is polygonal, having a pentagonal cross-section, however, in another embodiment shown in FIGS. 414 6C, the watering manifold 13 has a cylindrical isolation extension means 39 having a circular cross-section. In other embodiments the isolation extension means may be conical, pyramidal, or have rectangular, triangular and other cross-sections, including non-circular and polygonal cross-sections.

The wall means 40 of the preferred watering manifold 12 includes a sidewall 44 having a polygonal cross-section, attached to a base 46 and an endwall 48 having an aperture 50 to accommodate a diaphragm 52. The endwall 48 is also pentagonal and is attached to or is part of the end of sidewall 44, located opposite to the end attached to base 46. Alternatively, in the embodiment shown in the exploded view of FIG. 4, watering manifold 13 includes a cylindrical sidewall 45 having a circular cross-section and a circular endwall 49.

The preferred watering manifold 12 also includes a diaphragm 52 fixed to the surface of the isolation extension means 38, preferably on the outside of the endwall 48. Diaphragm 52 may be made from a sheet of rubberlike material, preferably silicone rubber. Diaphragm 52 has an x-shaped cut which forms a releasable entrance 54 for permitting a watering tube 36 from an outside watering system 34 to be introduced through diaphragm 52 and into the watering manifold 12 in order to connect the cage assembly 10 to the outside watering system 34 while maintaining the biological micro-isolation of the cage assembly, and releasable entrance 54 closes to seal the diaphragm 52 when the cage assembly 10 is disconnected from the outside watering system 34. A pentagonal cover plate 66 is also included as part of the isolation extension means 38. The cover plate 66 has an entrance 68 for permitting the insertion of the watering tube 36 through the releasable entrance 54 in diaphragm 52. Cover plate 66 is fixedly attached to endwall 48, for example by spot welding, to fixedly retain the diaphragm 52 between endwall 48 and cover plate 66. In the alternative embodiment shown in FIGS. 4-6C cover plate 67 is circular.

Figure 5:
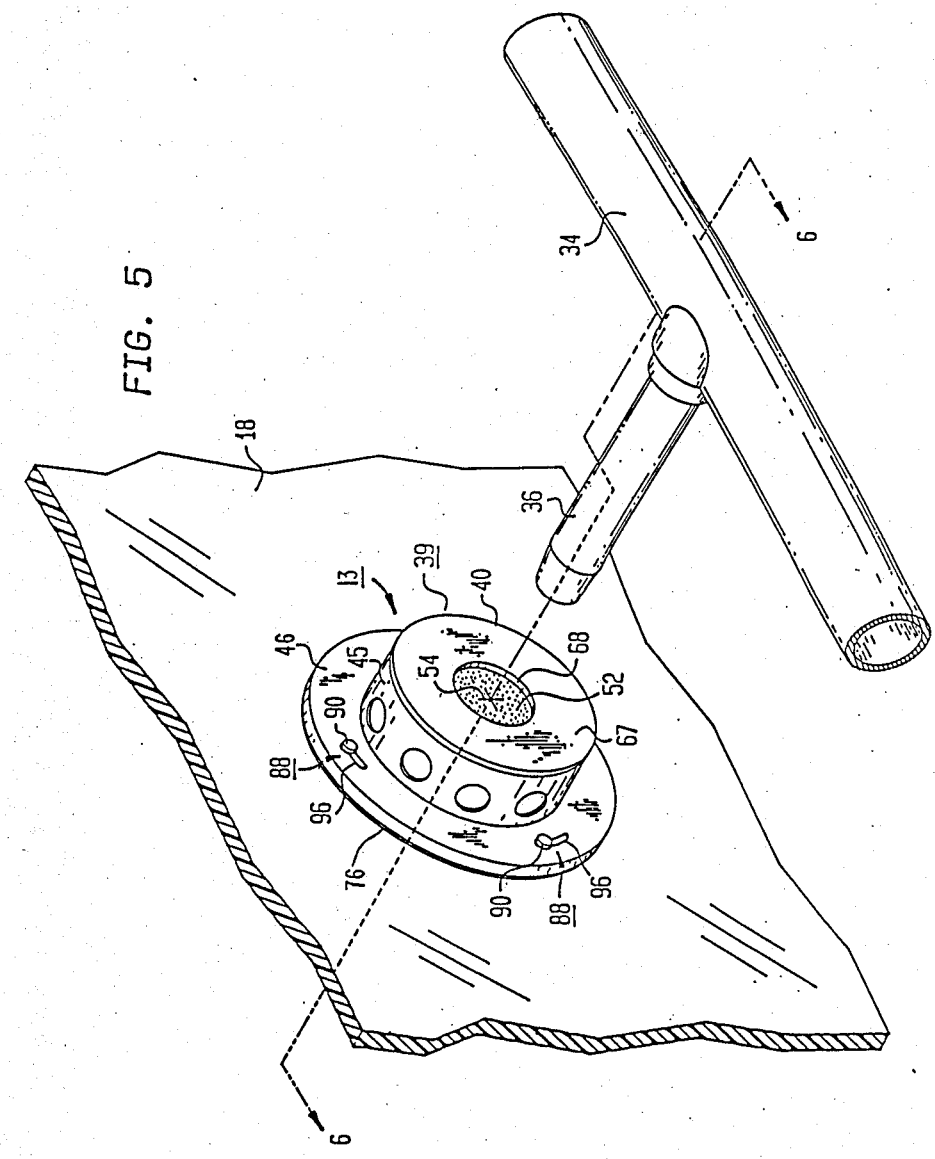
FIG. 5 is a prospective view of the embodiment of the watering manifold shown in FIG. 4 and of the watering tube from the outside watering system.
Figure 6C:
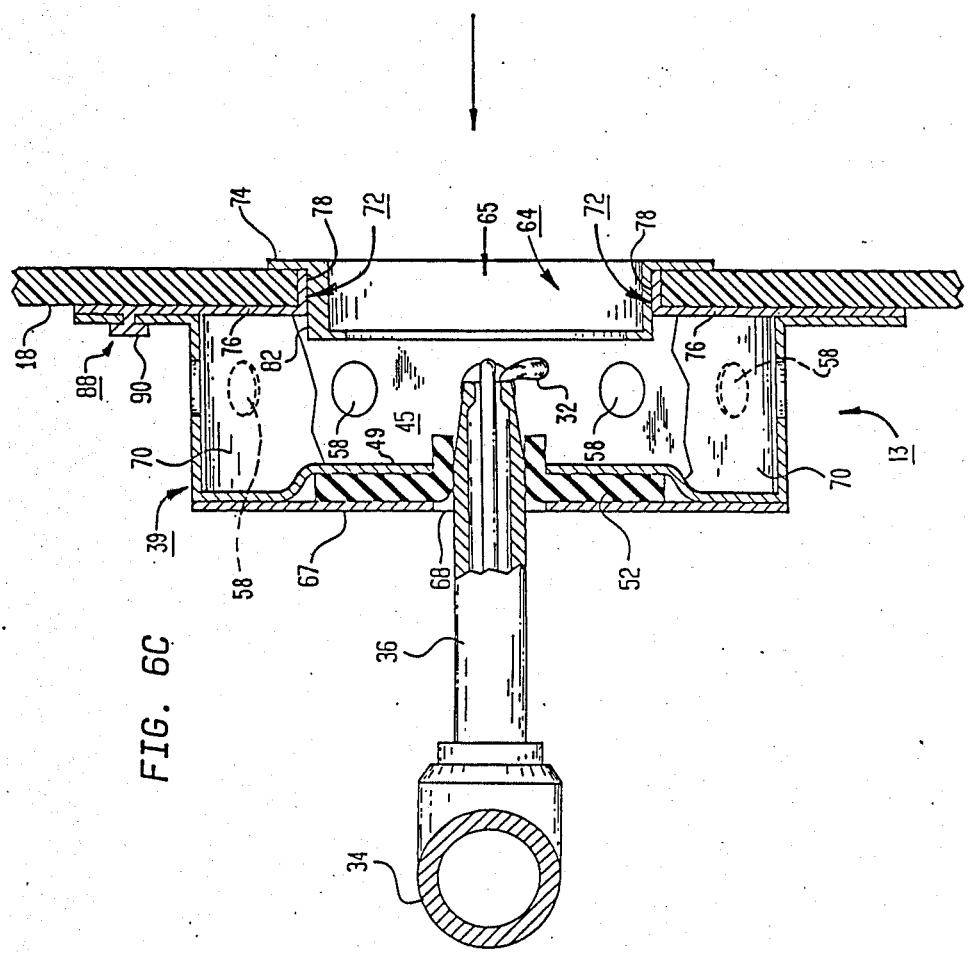
FIG. 6C is the view shown in 6B with the watering tube in working engagement inside the watering manifold.

FIG. 5 shows a perspective view of the watering tube 36 connected to the outside watering system 34 and the alternative embodiment of watering manifold 13 mounted on wall 18. FIGS. 6A-6C show detail cross-sectional views taken along the line 6—6 of FIG. 5, illustrating how the watering manifold 13 connects the cage assembly 10 to the outside watering system 34.

The preferred watering manifold 12 also includes a water removal means 56 for removing any water 32 from the watering manifold 12 that may have leaked from the watering tube 36 into the watering manifold 12 in order to prevent the flooding of the cage assembly 10 and injury to the confined animals 14. The preferred water removal means 56 includes at least one perforation 58 in the wall means 40 of isolation extension means 38. The perforation 58 is positioned below the level of the access port 64, mounted on the wall 18 of cage 16, and allows the drainage of water 32 through perforation 58 out of the isolation extension means 38 to prevent water from entering the cage 16 through access port 64. In the preferred watering manifold 12 the perforation 58 is a slot 62 which is positioned on the lowest-edge 60 of sidewall 44, corresponding to the lowest corner of the pentagonal cross-section of sidewall 44, edge 60 is positioned below the level of the access port 64. Preferably, the slot 62 runs along the length L of edge 60 and as a width W not greater than about one eight of an inch ($\frac{1}{8}$").

Figure 4:
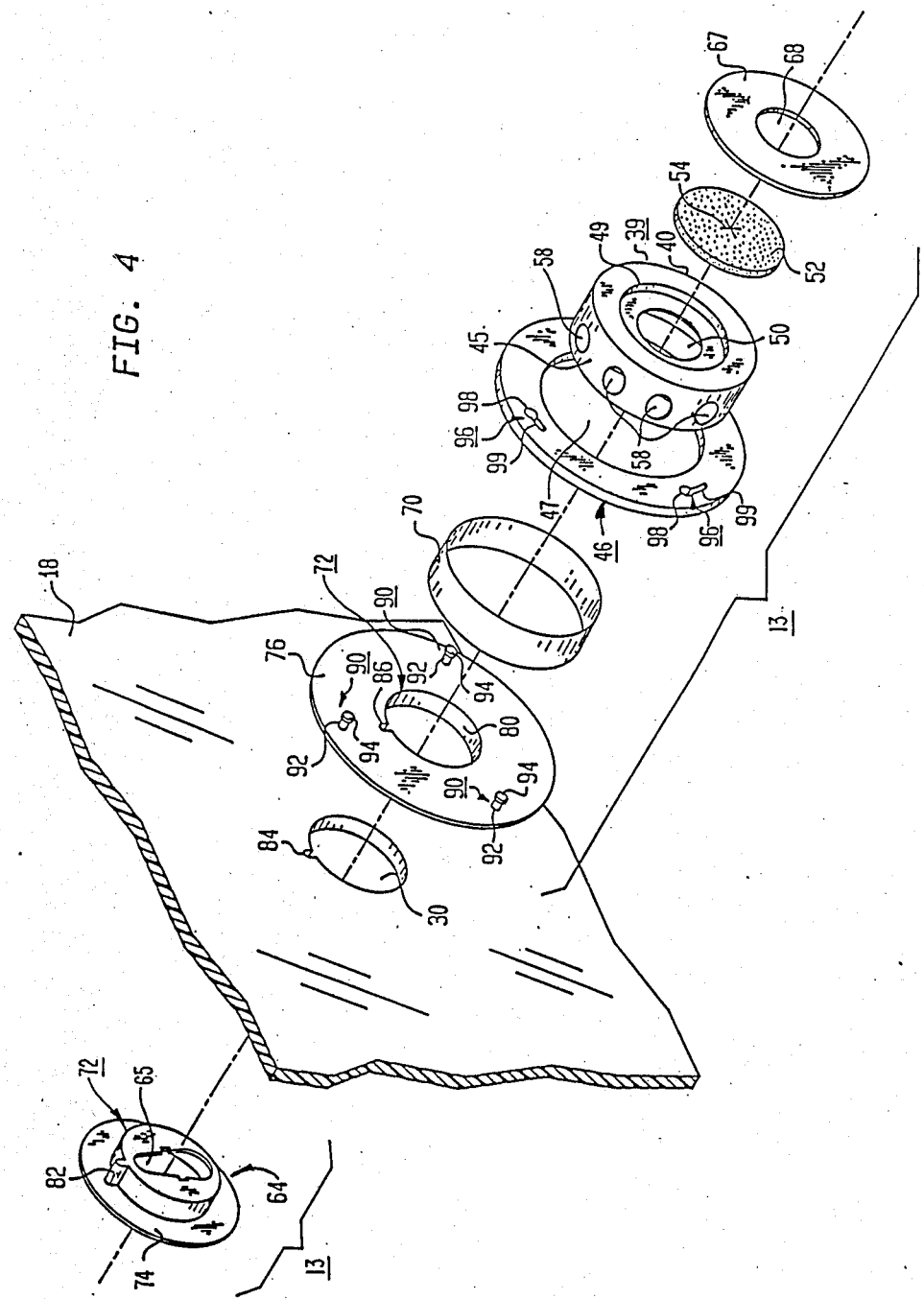
FIG. 4 is an exploded view of an alternative embodiment of the watering manifold of the present invention.

A filter 70, like the one shown in FIG. 4, may be included to cover the perforation 58, or slot 62, in order to allow water 32 to drain through the perforation 58, or slot 62, while maintaining the biological micro-isolation of the cage assembly. The preferred filter is made from spun-bonded polyester and is marketed by Dupont Corp. under the trademark Reemy ®. However, for most applications, filter 70 is not necessary when using the preferred watering manifold 12. In the alternative embodiment shown in FIG. 4 filter 70 is cylindrical so that it may be easily inserted into and removed from the cylindrical side wall 45 in order for it to cover perforations 58.

Access port 64 is also included in watering manifold 12, and is mounted in the aperture 30 on the inside of wall 18. Access port 64 has an aperture 65 having appropriate shape and size to allow the particular confined animal 14 access to the watering tube 36 in the isolation extension means 38 while denying the animal 14 access to the water removal means 56 or to diaphragm 52.

As illustrated in FIG. 2, the watering manifold 12 also includes an attachment means 72 for attaching the isolation extension means 38 onto the aperture 30 in wall 18 of cage 16, and for retaining the access port 64 in aperture 30. The attachment means 72 includes a rim 74, preferably integral with and surrounding access port 64 for holding access port 64 on the interior surface of wall 18. The attachment means 72 also includes a plate 76 for mounting onto the exterior surface of wall 18. Plate 76 has an aperture 78 through which the access port 64 can communicate with the environment 28 surrounding the cage assembly 10. A retaining means 80 on plate 76 fixedly attaches access port 64 to plate 76. Preferably the retaining means 80 is a press fitting means on aperture 78 to fixedly attach access port 64 and plate 76 so that access port 64 projects through aperture 78 of plate 76 and sandwiches the aperture 30 in wall 18 of cage 16 between rim 74 of access port 64 and plate 76. It is also preferred that aperture 30 in wall 18 is non-circular and that aperture 78, retaining means 80, and access port 64 are likewise non-circular in order to prevent access port 64 and plate 76 of attachment means 72 from rotating whenever the isolation extension means 38 is attached to, or detached from plate 76. In the preferred embodiment shown in FIG. 2 and in the alternative embodiment shown in FIG. 4 access port 64 is made non-circular by a bump 82 on its surface. Likewise, aperture 30 in wall 18 and aperture 78 in plate 76 are made non-circular by small notches 84 and 86, respectively, shaped to accommodate bump 82 to prevent rotation of the access port 64 and plate 76 through aperture 30.

The preferred watering manifold 12, also includes engagement means 88, which permits the isolation extension means 38 to engage attachment means 72 which is mounted on the cage 16 for use, and disengage from attachment means 72 and cage 16 for maintenance, cleaning and sterilization. The preferred engagement means 88 includes projection 90 having a neck 92 and a head 94 projecting from plate 76 of the attachment means 72. The engagement means 88 also includes projection holding means 96 on base 46 of wall means 40 of the isolation extension means 38. Base 46 includes an aperture 47 through which access port 64 can communicate with the environment 28 surrounding the cage assembly 10. The projection holding means 96 also includes an entrance 98 in base 46 which allows entry of the head 96 through the surface of base 46, and a narrow slot 99 which allows rotation of the isolation extension means 38 and the projection holding means 96 past neck 92 so that the slot 99 of the projection holding means 96 past neck 92 so that the slot 99 of the projection holding means 96 securely holds the head 94, and firmly attaches the isolation extension means 38 to plate 76 of the attachment means 72.

In the illustrated embodiments, unless otherwise specified, the components of the isolation extension means are stamped from sheet metal and assembled by spot welding. However, it is contemplated that the isolation extension means may be injection molded or cut from plastic and glued together or assembled from other suitable materials.

While the invention has been described with reference to the preferred embodiment thereof, it will be appreciated by those of ordinary skill in the art that various changes may be made to the structure, components and materials of the present invention without departing from its spirit and scope.

I claim:

1. An improved cage assembly for animals which includes a cage means having substantially non-permeable walls, floor and an open top body, a containment means to confine the animals inside the cage means, and a filter cap means which covers the cage means for biologically micro-isolating the animals from the environment surrounding the cage assembly, the improvement comprising:
    watering manifold mounted on an aperture in said cage means for allowing the animals to be supplied with water from an outside watering system and allowing the improved cage assembly to be disconnected from and reconnected to the outside watering system without destroying the integrity of the biologically micro-isolated cage from the environment whenever the cage assembly must be removed in order to handle, treat or observe the animals, said watering manifold including:
    (a) isolation extension means mounted on said aperture of said cage means having wall means for extending the biologically micro-isolated space of said cage means;
    (b) diaphragm means on a surface of said isolation extension means for permitting a watering means from an outside watering system to be introduced through said diaphragm means into said watering manifold to connect said cage assembly to said outside watering system while maintaining the biological micro-isolation of the cage assembly whenever said cage assembly is connected to or disconnected from said outside watering system;
    (c) water removal means for removing water from said watering manifold to prevent flooding the cage assembly by water leaking out from said watering means; and
    (d) access port means mounted in said aperture having an appropriate shape and size for allowing the animal access to said watering means in said isolation extension means while denying the animals access to said water removal means and said diaphragm means.

2. The cage assembly of claim 1, wherein said water removal means includes at least one perforation in said wall means of said isolation extension means, said perforation positioned below the level of said access port means to allow drainage of water out of said isolation extension means for preventing water from entering said cage means through said access port means; and
    said diaphragm means includes a sheet of rubber-like material for sealing an aperture in said wall means, said rubber like material having a releasable entrance for permitting said watering means to be introduced through said entrance.

3. The cage assembly of claim 2, wherein said watering manifold further includes:
    (a) attachment means for attaching said isolation extension means on said aperture and for retaining said access port means in said aperture;
    (b) engagement means for permitting said isolation extension means to be engaged to said attachment means for use and disengaged from said attachment means for maintenance, cleaning and sterilization.

4. The cage assembly of claim 3, wherein said attachment means includes:
    (a) a rim surrounding said access port means for holding the access port means to an interior surface of said cage means;
    (b) a plate on an exterior surface of said cage means, said plate having an aperture through which said access port means can communicate with the environment surrounding said cage means; and (c) retaining means to said plate for fixedly attaching said access port means and said plate to said cage means.

5. The cage assembly of claim 4, wherein said engagement means includes:
(a) projection means having a neck and a head projecting from said plate of the attachment means; and
(b) projection holding means on a base of said wall means of the isolation extension means, said base including an aperture through which said access port can communicate with the environment surrounding said cage assembly, said projection holding means further including an entrance in said base which allows entry of said head through the surface of said base and allows rotation of said isolation extension means past said neck so that said holding means securely holds said head for releasably attaching said isolation extension means to said plate of said attachment means.

6. The cage assembly of claim 5, wherein said wall means of said isolation extension means includes:
(a) a sidewall attached to said base;
(b) an endwall having an aperture for accommodating said diaphragm means, said endwall attached to an end of said sidewall of said isolation extension means opposite to the end having said base.

7. The cage assembly of claim 6, wherein said releasable entrance in the sheet of rubber-like material includes an x-shaped cut in the sheet of rubber-like material suitable for the insertion of a watering tube of the watering means and for sealing said entrance around the tube.

8. The cage assembly of claim 7, wherein:
(a) said access port means and said plate are press fit together so that said access port means projects through said aperture of said plate, said retaining means includes a press fitting means on the aperture of the plate to fixedly attach the access port means and the plate together on either side of said aperture of said cage means;
(b) said aperture in said cage means is non-circular and said retaining means is non-circular to prevent said access port means and the plate of said attachment means from rotating when said isolation extension means is attached to said plate means, and when said isolation extension means is detached from said plate means; and
(c) said isolation extension means further includes a cover plate having an entrance for permitting the insertion of said watering tube through said releasable entrance in the sheet of rubber-like material, the cover plate is fixedly attached to said endwall for fixedly retaining said sheet of rubber-like material between the end wall and the cover plate.

9. The cage assembly of claim 8, wherein said sidewall has a polygonal cross-section, and said perforation is positioned on an edge of said sidewall, the edge corresponding to a corner of said polygonal cross-section at the lowest point of said sidewall and below the level of said access port means.

10. The case assembly of claim 9, wherein said polygonal cross-section is pentagonal, and said perforation is positioned on an edge of said sidewall, corresponding to the lowest corner of said pentagonal cross-section, below said access port means.

11. The cage assembly of claim 10, wherein said perforation is a slot having its longitudinal dimension along said edge and having a width not greater than about one eighth of an inch.

12. The cage assembly of claim 10, wherein said water removal means includes filter means covering said perforation for allowing excess water to drain through said perforation while maintaining the biological micro-isolation of said cage assembly.

13. The cage assembly of claim 8, wherein said water removal means includes a filter means covering said perforation for allowing excess water to drain through said perforation while maintaining the biological micro-isolation of said cage assembly.

14. The cage assembly of claim 13, wherein said side wall includes a cylindrical sidewall, said filter means includes a cylindrical filter for insertion into said cylindrical sidewall for covering said perforation in said wall means of said isolation extension means, and said endwall includes a circular endwall.

15. A watering manifold for mounting on an aperture in a cage assembly used for confining animals, the watering manifold allows the animals to be supplied with water from an outside watering system and allows the cage assembly to be disconnected from and reconnected to the outside watering system without introducing biological contaminants through said watering manifold whenever the cage assembly must be moved in order to handle, treat or observe the animals, said watering manifold including:
(a) isolation extension means for mounting on said aperture of said cage assembly said isolation extension means having wall means for extending the interior space of said cage assembly;
(b) diaphragm means on a surface of said isolation extension means for permitting a watering means from said outside watering system to be introduced through said diaphragm means into said watering manifold to connect said watering manifold to said outside watering system without introducing biological contaminants through said diaphragm means whenever said watering manifold is connected to or is disconnected from said outside watering system;
(c) water removal means for removing water leaking out of said watering system from said watering manifold to prevent the watering means from flooding the cage assembly; and
(d) access port means having an appropriate shape and size for allowing the animals access to said watering means in said isolation extension means while denying the animals access to said water removal means and said diaphragm means, and said access port means being adapted for mounting in said aperture of said cage assembly.

16. The watering manifold of claim 15, wherein said water removal means includes at least one perforation in said wall means of said isolation extension means, said perforation positioned below the level of said access port means to allow drainage of water out of said isolation extension means for preventing water from flowing through said access port means and flooding said cage means; and said diaphragm mans includes a sheet of rubber-like material for sealing an aperture in the surface of at least one of said walls, said rubber-like material having a releasable entrance for permitting said watering means to be introduced through said entrance.

17. The watering manifold of claim 16, further including:
(a) attachment means for attaching said isolation extension means on said aperture of the cage assembly, and for retaining said access port means in said aperture of the cage assembly;
(b) engagement means for permitting said isolation extension means to be engaged to said attachment means for use and disengaged from said attachment means for maintenance, cleaning and sterilization.

18. The watering manifold of claim 17, wherein said attachment means includes:
(a) a rim surrounding said access port means for holding the access port means to an interior surface of said cage assembly;
(b) a plate surrounding said acess port means on an exterior surface of said cage assembly, said plate having an aperture through which said access port means can communicate with the environment surrounding said watering manifold; and
(c) retaining means on said plate for fixedly attaching said access port means and said plate to said cage assembly.

19. The watering manifold of claim 18, wherein said engagement means includes:
(a) projection means having a neck and a head on the plate of said attachment means; and
(b) projection holding means on a base of said wall means of the isolation extension means, said base including an aperture through which said access port means can communicate with the environment surrounding said watering manifold, said projection holding means further including an entrance in said base which allows entry of said head through the surface of said base and allows rotation of said isolation extension means past said neck so that said holding means securely holds said head for releasably attaching said isolation extension means to said plate of said attachment means.

20. The watering manifold of claim 19, wherein said wall means of said isolation extension means includes:
(a) a sidewall attached to said base; and
(b) an endwall having an aperture for accommodating said diaphragm means, said endwall attached to an end of said sidewall of said isolation extension means opposite to the end having said base.

21. The watering manifold of claim 20, wherein said releasable entrance in the sheet of rubber-like material includes an x-shaped cut in the sheet of rubber-like material suitable for the insertion of a watering tube of the watering means and for sealing said entrance around the tube.

22. The watering manifold of claim 21, wherein:
(a) said access port means and said plate are press fit together so that said access port means projects through said aperture of said plate, said retaining means includes a press fitting means on the aperture of the plate to fixedly attach the access port means and the plate together on either side of said aperture of the cage assembly;
(b) said retaining means is non-circular and said aperture in said cage assembly is non-circular to prevent said access port means and said attachment means from rotating when said isolation extension means is attached to said plate means, and when said isolation extension means is detached from said plate means; and
(c) said isolation extension means further includes a cover plate having an entrance for permitting the insertion of said watering tube through said releasable entrance in the sheet of rubber-like material, the cover plate is fixedly attached to said endwall for fixedly retaining said sheet of rubber-like material between the endwall and the cover plate.

23. The watering manifold of claim 22, wherein said sidewall has a polygonal cross-section, and said perforation is positioned on an edge of said sidewall, the edge corresponding to a corner of said polygonal cross-section at the lowest point of said sidewall and below the level of said access port means.

24. The watering manifold of claim 23, wherein said polygonal cross-section is pentagonal, and said perforation is positioned on an edge of said sidewall, corresponding to the lowest corner of said pentagonal cross-section below said access port means.

25. The watering manifold of claim 24, wherein said perforation is a slot having its longitudinal dimension extending along said edge and having a width not greater than about one eighth of an inch.

26. The watering manifold of claim 24, wherein said water removal means includes filter means covering said perforation for allowing excess water to drain through said perforation and for preventing the introduction of biological containments through said perforation.

27. The watering manifold of claim 22, wherein said water removal means includes a filter means covering said perforation for allowing excess water to drain through said perforation and for preventing the introduction of biological containments through said perforation.

28. The watering manifold of claim 27, wherein said sidewall includes a cylindrical sidewall, said filter means includes a cylindrical filter for insertion into said cylindrical sidewall for covering said perforation in said wall means of said isolation extension means, and said endwall includes a circular endwall.

* * * * *